A. WAYDITCH.
ATTACHMENT FOR TAKING CAMERAS FOR MAKING STEREOSCOPIC MOVING PICTURE FILMS.
APPLICATION FILED JAN. 3, 1913.
1,071,837.
Patented Sept. 2, 1913.
2 SHEETS—SHEET 2.
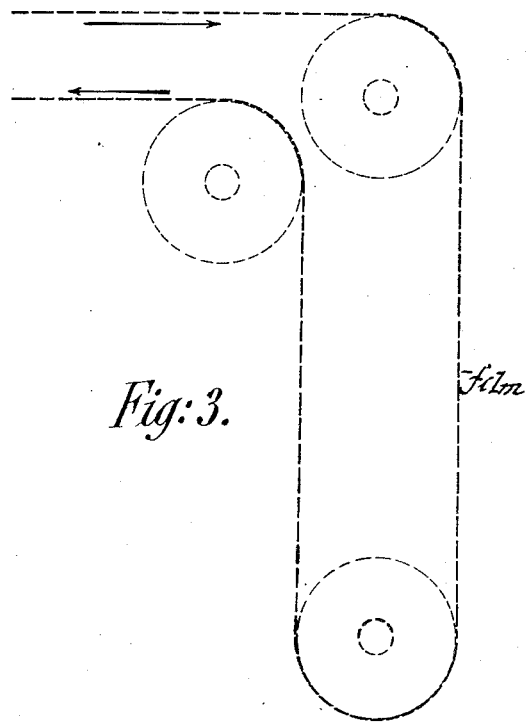
Fig. 3.
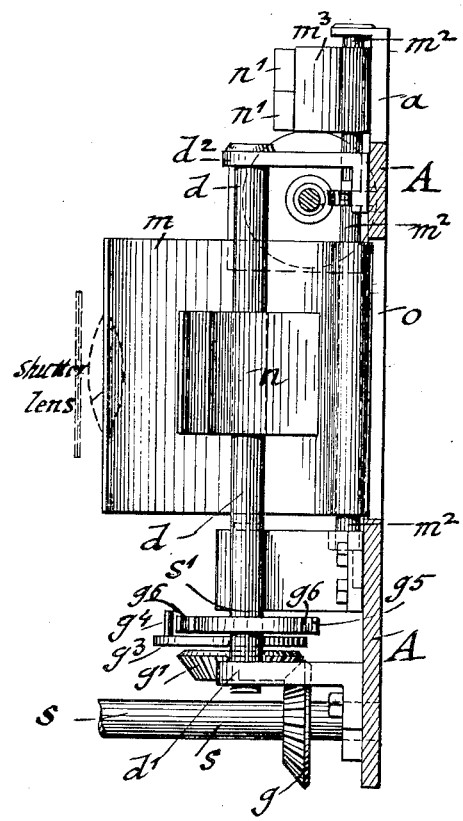
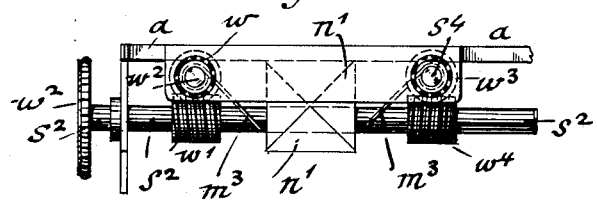
Fig. 4.

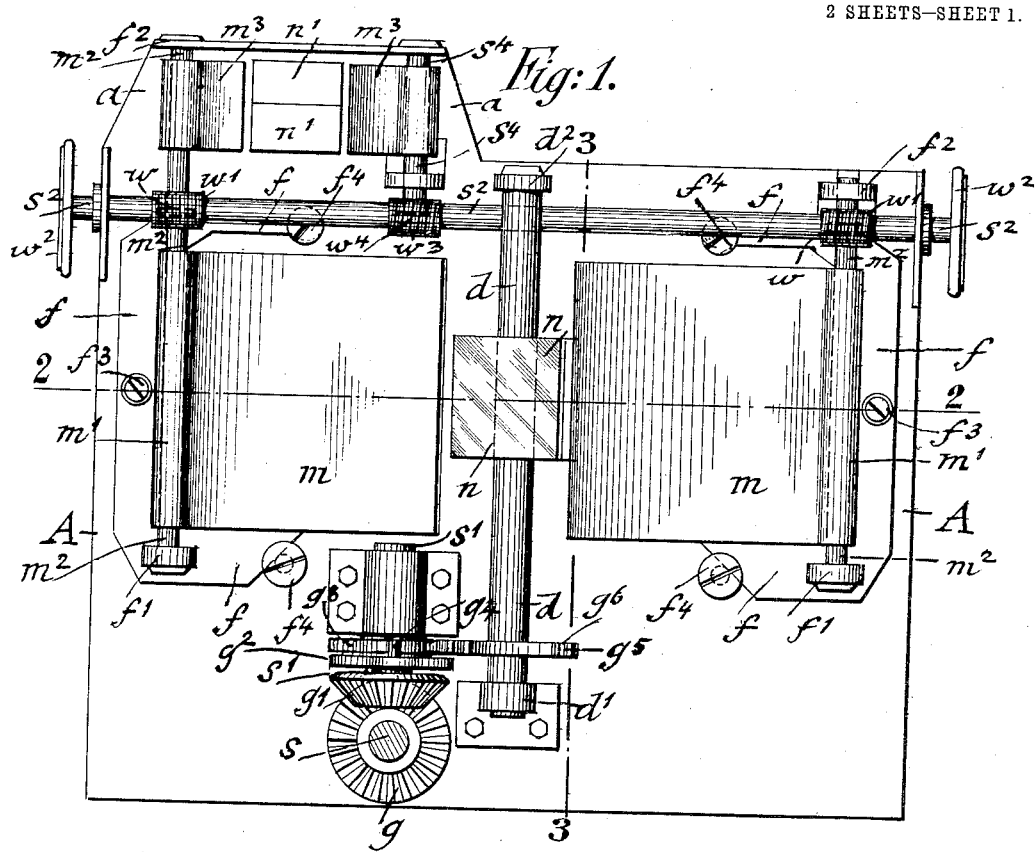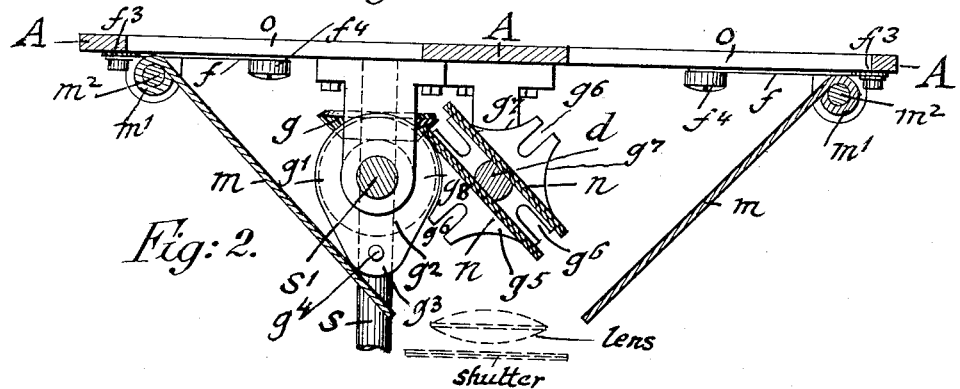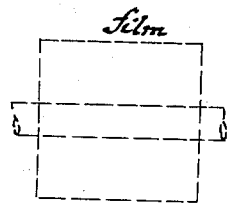

UNITED STATES PATENT OFFICE.

ALOYS WAYDITCH, OF NEW YORK, N. Y., ASSIGNOR TO STEREO-KINEMA FILM CO., OF NEW YORK, N. Y., A CORPORATION OF NEW YORK.

ATTACHMENT FOR TAKING-CAMERAS FOR MAKING STEREOSCOPIC MOVING-PICTURE FILMS.

1,071,837.  Specification of Letters Patent.  Patented Sept. 2, 1913.

Application filed January 3, 1913.  Serial No. 739,949.

*To all whom it may concern:*

Be it known that I, ALOYS WAYDITCH, a citizen of the Kingdom of Hungary, residing in New York, in the borough of Manhattan, county and State of New York, have invented certain new and useful Improvements in Attachments for Taking-Cameras for Making Stereoscopic Moving-Picture Films, of which the following is a specification.

This invention relates to an improved attachment for taking cameras for making stereoscopic moving-picture films.

On May 22, 1912, an application for a patent for a taking-camera for making stereoscopic moving-picture films, Serial No. 698,953, was filed by me. I have discovered, however, that the same result can be obtained by means of an attachment to the taking-camera for making the ordinary moving-picture films, so that these cameras may be used with my attachment for making stereoscopic films and without attachment for making the ordinary films, whereby the production of the stereoscopic moving-picture films is facilitated and all the advantages of the special taking-camera referred to obtained in a simpler and greatly improved manner; and for the purpose described the invention consists of an attachment for taking-cameras for moving-picture films, which comprises stationary side-mirrors placed at an angle to the vertical longitudinal center-plane of the camera, parallel mirrors placed back to back intermediately between the side-mirrors, means for alternately placing the parallel mirrors into position parallel with one or the other stationary side-mirror, openings in front of the side-mirrors, and means for adjusting the side-mirrors into proper angular position relatively to the vertical center-plane of the camera.

The invention consists further of a controlling device by which the correct position of the pictures to be taken by the taking-camera is controlled; and the invention consists lastly of certain details of construction which will be fully described hereinafter and finally pointed out in the claims.

In the accompanying drawings, Figure 1 represents a rear-elevation of my improved attachment for taking-cameras for making stereoscopic moving-picture films. Fig. 2 is a horizontal section on line 2, 2, Fig. 1. Fig. 3 is a vertical transverse section on line 3, 3, Fig. 1, and Fig. 4 is a detail plan-view of the controlling device.

Similar letters of reference indicate corresponding parts throughout the several figures of the drawings.

Referring to the drawings, A represents the front-wall of my improved attachment for taking-cameras. The front-wall is made of brass or other suitable material and provided with openings $o$. Adjacent to the openings are arranged on the front-wall A, two vertical mirrors $m$, which are adjusted to an angle of 45° to the vertical center-plane of the taking-camera, one on each side of the same. Each side-mirror $m$ is attached at its front-edge to a metallic sleeve $m^1$ which is secured to an upright shaft $m^2$ that is supported in step and neck-bearings $f^1$, $f^2$ of an adjustable frame $f$, which has approximately the shape of the letter C. Each frame $f$ is fulcrumed to a pivot $f^3$, which is arranged intermediately between the upper and lower portions of the C-shaped frame $f$, the frame swinging on said pivot, while, after proper adjustment of the mirrors into vertical direction, the upper and lower ends of the frame are clamped to the front-wall A by clamping screws $f^4$ which extend over the ends of the frames. After the position of the mirrors is obtained by the adjustment of the supporting frames $f$, the mirrors are in their proper position for making exposures for the film.

Intermediately between the side-mirrors and supported in suitable step and neck-bearings $d^1$, $d^2$ of the front-wall A is arranged an upright shaft $d$, to opposite sides of which are applied two parallel mirrors $n$ of smaller size than the side-mirrors $m$, the axis of the shaft $d$ being in line with the vertical longitudinal center-plane of the taking-camera and the attachment. The mirrors $n$ are set normally at an angle of 45° to the front-wall of the attachment. Intermittent rotary motion is imparted to the upright shaft $d$ and the parallel mirrors $n$ thereon from the driving shaft $s$ of the taking-camera, said shaft being driven by the motor of the taking-camera and transmits its rotary motion by bevel gear-wheels $g$, $g^1$ to a short vertical intermediate shaft $s^1$, which turns in bearings on the lower portion of the front-wall of the attachment sidewise of and parallel with the shaft $d$, said intermediate shaft being provided with a disk $g^2$ having a crank-shaped extension $g^3$ carrying a pin $g^4$, as shown in Figs. 1 and 2. Near the lower part of the upright shaft $d$ is arranged a star-shaped wheel $g^5$, which is provided with four radial recesses $g^6$ and intermediate arc-shaped recesses $g^7$, which latter correspond with and form contact with the circumference of a collar $g^8$ on the disk $g^2$. The rotation of the intermediate shaft $s^1$ produces the intermittent engagement of the crank-pin $g^4$ with the radial recesses $g^6$ and thereby the intermittent turning for a quarter of a rotation and simultaneously the turning of the mirrors $n$ through an angle of 90° so as to place them alternately into a position parallel with the left-hand mirror or parallel with the right-hand mirror $m$ and enable the light-rays from the objects to be taken to be reflected from the left side-mirror $n$ and the mirror $n$, then parallel thereto through the lens and the openings of the shutter of the taking-camera arranged back of the same; while the next quarter turn of the star-shaped wheel $d^5$ places the second mirror $n$ parallel with the right-hand mirror, and produces thereby a second picture on the film in connection with the lens and shutter of the taking-camera. The position of the lens, shutter and film is indicated in dotted lines in Figs. 2 and 3, the film being located at the proper focusing distance to the rear of the lens and shutter.

With each forward motion of the film in the taking-camera, first a picture from the left-hand side-mirror, and the mirror $n$ parallel thereto, then a picture by the right-hand side-mirror and the mirror parallel thereto is produced on the film, which, as the openings in the front-wall of the attachment correspond with the distance between the eyes, form alternating stereoscopic pictures on the film.

To assist in the accurate positioning of the side-mirrors, the shafts of the same are provided at their upper ends with worm gear-wheels $w$, that intermesh with worms $w^1$ on a horizontal shaft $s^2$, which turns in suitable bearings on the rear of the front-wall A, and which is provided with hand-wheels $w^2$ at each end for being conveniently taken hold of either by the right or the left hand for producing the proper angular position of the side-mirrors toward the vertical center-plane of the taking-camera.

Above one of the side-mirrors $m$ is arranged on the front-wall of the casing A a controlling device which corresponds in some respects to the finder of a photographic camera and which consists of two smaller auxiliary mirrors $m^3$ one on the extension of the upright shaft $m^2$ of the left-hand side-mirror, and the other on a short auxiliary shaft $s^4$ supported in suitable neck and step bearings of an extension $a$ of the front-wall A. The mirrors $m^3$ are placed at an angle of 45° to the vertical center-line of the controlling device, so that the left-hand auxiliary mirror $m^3$ is always in the same plane with the left-hand side-mirror $m$, but at some distance above the same, while the second mirror $m^3$ is parallel with the right-hand side-mirror $m$. Between the auxiliary mirrors $m^3$ are interposed two stationary reflecting prisms $n^1$, one vertically above the other, the longer side of the upper one being parallel with the left-hand and the longer side of the lower one parallel with the right-hand mirror $m^3$, so that when exposures for the moving-picture films are made, the pictures shown on the rear faces of the prisms appear properly centered by their upper and lower portions on the prisms. As soon as the upper half of the picture reflected on the upper prism is not properly centered with the lower half of the picture produced on the lower prism, then the adjustment of the auxiliary and main-mirrors has to be made by the worm-gear transmissions so as to bring the pictures reflected on the upper as well as on the lower prism into the center-line, and control or correct thereby the accurate position of the main-mirrors $m$ in the taking of the moving pictures on the film. The adjustment of the auxiliary mirrors $m^3$ is produced by the worm-gear $w$ on the shaft $m^2$ described in connection with an auxiliary worm $w^3$ on the shaft $s^4$ and a worm-gear $w^4$ on the shaft $s^2$ as shown in Figs. 1 and 4. By the adjustment of the auxiliary mirrors of the controlling device, the principal side-mirrors $m$ of the taking attachment are adjusted to their proper relative angle toward each other for making accurate exposures on the moving-picture film of the taking-camera.

My improved attachment for taking-cameras permits the use of the ordinary taking-cameras at present for making also stereoscopic moving-picture films, so that the expense of a special taking-camera for this purpose is obviated.

I claim:

1. An attachment for taking-cameras for making stereoscopic moving-picture films, comprising a front-wall having openings, side-mirrors inclined toward each other, parallel mirrors between said side-mirrors, and means for imparting intermittent rotary motion to said parallel mirrors so as to reflect the pictures to be taken by the right or left side-mirror.

2. An attachment for taking-cameras for making stereoscopic moving-picture films, comprising a front-wall having openings, side-mirrors inclined toward each other, parallel mirrors between said stationary mirrors, means for intermittently rotating said mirrors so as to reflect the pictures alternately reflected by the right or left side-mirror, and means for transmitting rotary motion from the driving shaft of the taking-camera to the intermittently-rotating means.

3. An attachment for taking-cameras for making stereoscopic moving-picture films, comprising a front-wall having openings, side-mirrors adjacent to said openings and inclined toward each other, parallel intermediary mirrors, means for intermittently rotating said intermediary mirrors, and means for adjusting the inclined side-mirrors into vertical position.

4. An attachment for taking-cameras for making stereoscopic moving-picture films, comprising a front-wall having openings, side-mirrors adjacent to said openings and inclined toward each other, parallel intermediary mirrors, means for intermittently rotating said intermediary mirrors, a frame for supporting said side-mirrors, and means for adjusting said frame and mirrors for setting the mirrors into vertical position.

5. In an attachment for taking-cameras for making stereoscopic moving-picture films, the combination of a front-wall having openings, side-mirrors adjacent to said openings and inclined toward each other, parallel mirrors between said side-mirrors, means for intermittently rotating said parallel mirrors so as to transmit reflections first from one and then from the other side-mirror, and means for adjusting the relative angular position of the mirrors toward the front-wall.

6. In an attachment for taking-cameras for making stereoscopic moving-picture films, the combination of a front wall having openings, side-mirrors adjacent to said openings and inclined toward each other; upright shafts for the same, parallel mirrors between said side-mirrors, means for intermittently rotating said parallel mirrors so as to transmit reflections first from one and then from the other side-mirror, and a worm-gear connection for the shafts of the side-mirrors for adjusting the relative position of the same toward the parallel mirrors.

7. In an attachment for taking-cameras for making stereoscopic moving-picture films, the combination of a front-wall having openings, mirrors adjacent to said openings and inclined toward each other, parallel mirrors between said side-mirrors, means for intermittently rotating said parallel mirrors so as to take reflections first from one and then from the other side-mirror, and a controlling device arranged above one of the side-mirrors for adjusting the mirrors into proper angular position, and means for adjusting the controlling device simultaneously with the side-mirrors.

8. In an attachment for taking-cameras for making stereoscopic moving-picture films, a controlling device, comprising auxiliary mirrors inclined toward each other, intermediary reflecting prisms one placed on top of the other, and means for adjusting the auxiliary mirrors relatively to the intermediary prisms.

In testimony, that I claim the foregoing as my invention, I have signed my name in presence of two subscribing witnesses.

ALOYS WAYDITCH.

Witnesses:
PAUL GOEPEL,
JOHN MURTAGH.